United States Patent
Kopannia et al.

(10) Patent No.: US 8,969,440 B2
(45) Date of Patent: Mar. 3, 2015

(54) COMPOSITE MATERIAL CONTAINING NATURAL FIBERS

(71) Applicant: Henkel AG & Co. KGaA, Duesseldorf (DE)

(72) Inventors: Siegfried Kopannia, Krefeld (DE); Katja Klophaus, Cologne (DE); Dieter Dausmann, Muenchweiler (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/760,387

(22) Filed: Feb. 6, 2013

(65) Prior Publication Data

US 2013/0150490 A1    Jun. 13, 2013

Related U.S. Application Data

(63) Continuation of application No. PCT/EP2011/061921, filed on Jul. 13, 2011.

(30) Foreign Application Priority Data

Aug. 6, 2010 (EP) .................................... 10172112

(51) Int. Cl.
| | | |
|---|---|---|
| *C08L 1/00* | (2006.01) | |
| *C08K 7/02* | (2006.01) | |
| *C08G 69/26* | (2006.01) | |
| *C08G 69/34* | (2006.01) | |
| *C08G 69/40* | (2006.01) | |
| *C08J 5/04* | (2006.01) | |
| *C08L 77/08* | (2006.01) | |

(52) U.S. Cl.
CPC ................ *C08K 7/02* (2013.01); *C08G 69/265* (2013.01); *C08G 69/34* (2013.01); *C08G 69/40* (2013.01); *C08J 5/045* (2013.01); *C08L 77/08* (2013.01); *C08J 2377/08* (2013.01)
USPC .............................................. 524/35; 524/13

(58) Field of Classification Search
USPC .................................................... 524/13, 35
See application file for complete search history.

(56) References Cited

U.S. PATENT DOCUMENTS

| 4,045,389 | A | * | 8/1977 | Drawert et al. ................ 528/324 |
|---|---|---|---|---|
| 4,150,002 | A | * | 4/1979 | Drawert et al. ............ 528/339.3 |
| 4,396,759 | A | * | 8/1983 | Drawert et al. ............ 528/339.3 |
| 5,204,396 | A | * | 4/1993 | Murakami et al. ............ 524/394 |
| 5,317,037 | A | | 5/1994 | Golden et al. |
| 6,706,106 | B1 | | 3/2004 | Naegele et al. |
| 2009/0291288 | A1 | | 11/2009 | Kopannia et al. |
| 2010/0087585 | A1 | | 4/2010 | Yasuda et al. |

FOREIGN PATENT DOCUMENTS

WO    0059989 A1    10/2000

OTHER PUBLICATIONS

Bledzki, A. K., et al. "Composites reinforced with cellulose based fibres," Prog. Polym. Sci., 1999, 24, 221-274.*
English-language translation of WO/2000/059989 with line numbers. Translation performed in EPO website on Jun. 28, 2013.*
Laura, D. M., "Effect of glass fiber and maleated ethylene-propylene rubber content on tensile and impact properties of Nylon 6," Polymer, 2000, 41, 7165-7174.*
Hablot, Elodie et al., "Renewable biocomposites of dimer fatty acid-based polyamides with cellulose fibers: Thermal, physical and mechanical properties" Composites Science and Technology, Elsevier Ltd., vol. 70, 2010, pp. 504-509.
Hablot, Elodie et al., "Yield behaviour of renewable biocomposites of dimer fatty acid-based polyamides with cellulose fibres" Composites Science and Technology, Elsevier Ltd., vol. 70, 2010, 525-529.

* cited by examiner

*Primary Examiner* — Melissa Rioja
*Assistant Examiner* — Nicholas Hill
(74) *Attorney, Agent, or Firm* — James E. Plotrowski

(57) ABSTRACT

Composite materials contain fibers from natural sources and polyamides, wherein the polyamides have a softening point below 220° C., and a heat deflection temperature above 50° C. The polyamides consist of a) 30 to 70 mol % dimeric fatty acids, b) 30 to 70 mol % aliphatic dicarboxylic acids, c) 70 to 98 mol % aliphatic diamines, d) up to 25 mol % cycloaliphatic diamines e) up to 20 mol % polyether diamines, wherein aliphatic dicarboxylic acids are selected from linear, non-branched C10 to C18 dicarboxylic acids, and wherein the weighted average number of C-atoms is between 11.5 to 14.5, and the sum of mol % for acids and amine each add to 100.

14 Claims, No Drawings

COMPOSITE MATERIAL CONTAINING NATURAL FIBERS

This application is a continuation under 35 U.S.C. §§365 (c) and 120 of International Application No. PCT/EP2011/061921, filed on Jul. 13, 2011, and published on Feb. 9, 2012, which claims priority from European Patent Application No. 10172112.4, filed on Aug. 6, 2010, which are incorporated herein by reference in their entirety.

BACKGROUND OF THE INVENTION

The present invention relates to composite materials, which are based on polyamides as matrix compound and natural fibers. The invention does also include moldings manufactured from such composite materials, which are stable against humidity and elevated temperature.

EP1129139 discloses compositions to be processed in molten form. They shall include organic fibers which are embedded in natural polymers like starch or cellulosic material. These mixtures have some disadvantages in processing, so according to the invention shellac has to be added as processing additive. Parts form such components are not very stable against weathering conditions and humidity.

U.S. Pat. No. 5,317,037 relates to melt-moldable compositions which can be shaped into useful articles which have sufficient strength in a dry environment. The composition contains organic fibers and meltable, water-soluble binders. As binders natural polymers are disclosed like sugar, polydextrose, gelatin, gluten, hydroxymethyl cellulose, gum arabic and starch. Such polymers shall be water soluble with the effect that such compositions rapidly disintegrate and degrade in a wet environment.

WO2008/107615 discloses compositions which contain polyamides, polylactic acid, eventually an agent for better compatibility and natural or synthetic fibers. Polylactic acid as polymer contains many polar groups, so the stability against moisture is low. Also the mechanical properties of such formed parts do not meet many requirements.

WO2008/064950 discloses molded parts made from polymers from the hot melt type. Also specific polyamides are disclosed, but no compositions containing fibers are mentioned. The molded parts shall have the ability to get molten at one end so that they can be glued to metallic surfaces.

WO00/59989 discloses composite materials from natural fibers and as matrix material oleochemical thermoplastic polymers such as polyester, polyamides or polyesteramides. As component dimer fatty acid is listed together with other useful monomeric components. As examples polyamides based on dimer fatty acid/acelaic acid and dimer amines are disclosed. No specific composite compounds or specific polyamides are disclosed.

Polyamides are known in different compositions. According to their chemical structure, they can have softening points in a wide range. A principal problem of such polyamides is the relatively high melting temperature. This is important, as for many applications polyamides are used in an injection molding process. In this process it is advantageous to have a lower melting point, so that the energy costs can be saved. Additionally the viscosity of such polymers will be lower which influences the manufacturing process. On the other hand if the parts manufactured from such polyamides are used in the practice, they should have stable properties even at higher temperature. If the softening point is low the mechanical stability of such parts will decrease, e.g. in the vicinity of heat evolving machines such parts are not usable. So the use of such parts made from polyamides is limited. It is known to use component parts which have to perform a variety of functions composed of two or more layers which have to be bonded to one another at a bonding surface. This requires two different materials, the basic materials are expensive and additionally the manufacturing is difficult.

Fibers of oil based origin are known. But composition and surface often lead to problems in the adhesion to a matrix material. Natural fibers have fewer chemical variances at the surface so they show good adhesion to polar polymers. Such fibers of natural origin may be susceptible to water. This humidity may influence the mechanical properties of the material.

SUMMARY OF THE INVENTION

The present invention has the object to provide a composite material based on fibers from natural sources and polyamides to prepare compositions which can be applied by an injection molding process. Additionally the composition shall be stable and will not deteriorate under the temperature regime as required by the manufacturing process.

Another object of the present invention is to provide shaped articles manufactured from such melt-moldable compositions which shall be stable against temperature and humid environmental conditions. Such composite parts shall be mechanically stable under the condition of use and show an excellent mechanical strength and rigidity. More specifically, it is an object of the invention to prepare a composition which can be formed into a molded article with a stability so that it can be used at elevated temperature without mechanical failure.

The object is achieved by a composite material containing (i) 15 to 60 wt % fibers from natural sources, (ii) 80 to 35 wt % polyamides, (iii) 0.1 to 30 wt % additives, wherein the polyamides have a softening point below 220° C., a heat deflection temperature above 50° C. and the polyamides comprise of (a) 30 to 70 mol % dimer fatty acids, (b) 70 to 30 mol % aliphatic dicarboxylic acids, (c) 98 to 70 mol % aliphatic diamines, (d) up to 25 mol % cycloaliphatic diamines (e) up to 20 mol % polyether diamines, characterized in that the aliphatic dicarboxylic acids are selected from linear, non-branched C10 to C18 dicarboxylic acids, whereby the weighted average number of C-atoms is between 11.5 to 14.5 and the sum of mol % of acids and amines each add to 100%.

DETAILED DESCRIPTION OF THE INVENTION

The composite material according to the invention shall include fibers and a polyamide resin. As fibers, the known natural fibers can be used. For application reasons it is preferred that the fibers are dry and do not contain much water. The fibers shall be short, which means that the lengths shall be such that the composite material can be processed by an injection molding process. The second required compound is the polyamide resin. The polyamide resin can be composed of known raw materials. But it is required that the heat stability of this polymer shall be high, on the other hand the melt viscosity shall be low. The heat stability can be measured by the heat deflection temperature as a technical value for such property. The carboxylic acids of the polyamide shall be selected to achieve a high heat deflection temperature of the polyamide.

The composite according to the invention contains polyamides. According to the invention, the polymer and its monomers are selected so that the composite material shows stability against humid conditions with less degradation or loss of mechanical properties. Additionally, in order to obtain molded parts stable for use at elevated temperature it is required that the mechanical weakening of the polymer compound is shifted to elevated temperature. This feature is contrary to the requirement of easy processing of the mixture to form the articles, which generally shall be selected to lower temperature. So the chemical components of the polyamide have to be selected to be suitable for the intended application.

A suitable polyamide shall contain dimeric fatty acids. Dimeric or polymeric fatty acids, in the context of the present invention, are those fatty acids which are prepared in a known manner by dimerising unsaturated long-chain fatty acids obtained from naturally occurring raw materials and are then further purified by distillation. Technical grade dimeric fatty acids contain, depending on the degree of purity, up to 10 wt % of monobasic fatty acids, more then 70 wt % of C36 dibasic fatty acids (dimeric fatty acids in the stricter sense) and up to 20 wt % of C54 and higher polybasic fatty acids ("trimeric fatty acids"). The relative ratios of monomeric, dimeric and trimeric fatty acids in the polymeric fatty acid mixture depends on the nature of the starting compounds used and on the conditions of polymerisation, dimerisation or oligomerisation and the extent of separation by distillation. Dimeric fatty acids purified by distillation contain at least 80 wt % and frequently 95-99 wt % of dimeric fatty acids. In a further process step, these dimeric fatty acids may also be hydrogenated.

In addition to the dimeric fatty acids the acid component of the polyamide shall contain C10 to C18 dicarboxylic acids. Examples of these types of dicarboxylic acids are decandicarboxylic acid, dodecanedicarboxylic acid, tridecandicarboxylic acid, tetradecandicarboxylic acid, octadecandicarboxylic acid or other homologue diacids or mixtures of such dicarboxylic acids. To achieve the lower melting point and a higher heat deflection temperature it is preferred that the weighted average number of C-atoms of the mixture of C10 to C18 dicarboxylic acids is between 11.5 to 14.5.

The weighted average number is calculated according to the formula:

weighted average C-atom=(sum of mol %×C-atoms of dicarboxylic acid):100

If the average number of C-atoms is too high, the mechanical properties at higher temperature are excellent but the viscosity and the softening point is too high, so the processability is bad. If the number of C-atoms is lower the viscosity decreases, but the polymer shows an increased brittleness at low temperature which limits the application of the resulting formed parts. A preferred embodiment selects the weighted average C-atoms from 12 to 14. Another preferred embodiment contains at least 85 wt % of C12 to C14 dicarboxylic acids (related to the amount of such dicarboxylic acids of component (b)).

The acid component of the polyamide may optionally contain additionally aminocarboxylic acids or the cyclic derivatives thereof with C5 to C18 backbone and/or C2 to C8 dicarboxylic acids in an amount up to 10 mol %. Examples of such components include 6-aminohexanoic acid, 11-aminoundecanoic acid, laurolactam and ε-caprolactam; or succinic acid, maleic acid, glutaric acid, adipic acid or suberic acid.

The diamine component contains of one or more aliphatic diamines, preferably having an even number of carbon atoms, wherein the amino groups are at the terminus of the carbon chains. The aliphatic diamines may contain 2 to 20 carbon atoms, wherein the aliphatic chain may be branched or preferably linear. Specific examples are ethylenediamine, diethylenetriamine, dipropylenetriamine, 1,4-diaminobutane, 1,3-pentanediamine, methylpentanediamine, hexamethylenediamine, trimethylhexamethylenediamine, 2-(2-aminomethoxy)ethanol, 2-methylpentamethylene-diamine, diaminodipropylmethylamine, 1, 12-diaminododecane. Preferred aliphatic diamines are C2 to C8 diamines having an even number of carbon atoms or oligomers thereof containing 2 to 5 of such units.

The amino component may also contain cyclic aliphatic diamines or heterocyclic diamines, such as 1,4-cyclohexane diamine, 4,4'-diaminodicyclohexylmethane, piperazine, cyclohexane-bis-(methylamine), isophorone diamine, dimethylpiperazine, dipiperidylpropane, norbornanediamine or mxylylenediamine or mixtures thereof. Such diamines shall contain at least two reactive NH-groups. The molecular weight of such cyclic diamines is between 80 g/mol to about 300 g/mol. The amount of cyclic diamines is between 0 to 25 mol %, preferably more than 1 mol %.

In addition the amino component may contain polyoxyalkylene diamines, such as polyoxyethylene diamine, polyoxypropylene diamine or bis-(diaminopropyl)poly-tetrahydrofuran, may also be used. The polyoxyalkylene diamines also known as JEFFAMINES® (tradename of the Huntsman Co.), are particularly preferred. The molecular weight of the polyoxyalkylene diamines used is between 100 and 4000 g/mol, preferably between 400 and 2000 g/mol. The amount of such polyoxyalkylene diamines is between 0 to 20 mol %, preferably 1 to 15 mol %.

A different embodiment may optionally comprise a small amount of dimer diamines, which are dimeric forms of unsaturated C18 diamines, also in hydrogenised form.

A suitable polyamide shall contain 70 to 98 mol % of aliphatic diamines and up to 25 mol % of cycloaliphatic diamines or polyoxyalkylene diamines or mixtures. Another embodiment may additionally contain 0 to 15 mol % dimer fatty diamines.

Preferably the polyamides shall contain 80 to 95 mol % linear aliphatic diamines from C2 to C20. Particularly preferred are polyamides containing 50 to 95 wt % (related to all diamines) of C2 to C8 diamines, most preferred are C2 to C4 diamines.

The dicarboxylic acids are used in a slight excess relative to the diamines, such that carboxyl-terminated polyamides are obtained but also amino-terminated polymers are possible. A preferred embodiment of polyamides suitable according to the invention is produced from
70 to 30 mol %, dimeric fatty acid,
30 to 70 mol % of one or more C10-C18 dicarboxylic acid(s)
70 to 98 mol % of at least one aliphatic diamine equal/less than C20,
0 to 15 mol % of dimeric fatty diamines,
1 to 25 mol % of one or more cycloaliphatic diamines
1 to 20 mol % of polyether diamines,
wherein the sum total of diamines used amounts to 100 mol %, the sum total of carboxylic acids used amounts to 100 mol %, and the weighted average number of C-atoms of such dicarboxylic acids is between 11.5 to 14.5.

The molecular weight of the polyamides to be used according to the invention is approximately 100000 to 2000000 g/mol, preferably more than 300000 g/mol, particularly preferably between 500000 and 15000000 g/mol (weight average molecular weight, $M_w$). The viscosity of the polyamides to be used according to the invention is between 1000 and 50000 mPa·s, preferably between 3000 and 30000 mPa·s, measured at 225° C.

The softening point of the polyamide is below 220° C., preferably from 170° C. to 200° C. It is required that the polyamide shall have a heat deflection temperature (HDT) above 50° C. Preferably, the heat deflection temperature is more than 65° C. If the heat deflection temperature is lower, then the stability of the composite material is too low. In such cases the use of the moldings is less suitable in an environment which is subject to higher temperature. The heat deflection temperature can be improved by a higher amount of dicarboxylic acids and/or by a higher weighted average number of C-atoms. The heat deflection temperature will be lower than 120° C. If it is too high the viscosity will increase to very high values with detrimental effects for the application process.

It is preferred if the polyamide shall have a glass transition temperature ($T_G$) between −10 to +25° C. ($T_G$ measured by DSC) so the flexibility of the polymer is high. The polyamides used according to the invention preferably do not contain any solvents.

The composite material according to the invention shall contain fibers of natural sources. Fibers from natural origin are products which stem preferably from plants. Examples of such fibers are cotton, jute, flax, hemp, bast, sisal, ramie, coconut fibers, yucca fibers, manila, bagasse, esparto reeds, straw or wood. Typically such fibers contain cellulose, lignin, protein or starch molecules as fiber material or in a chemically modified form. Such fibers are thin, flexible materials which longitudinal direction is much higher than their diameter.

The fibers shall have a length of 1 to 50 mm preferably from 2 to 30 mm. It is possible to use mixtures of different types. The fibers can be processed, for examples spun, cut or stapled but the fibers shall be uniformly mixable with the molten polyamide. The amount of fibers in the composite material shall be in the range from 15 to 60 wt %, preferably from 20 to 50 wt %. The fibers can be stored in the normal environment. Preferably the water content of the fibers prior to processing shall be lower than 5 wt %, particularly below 1 wt %.

In addition to the polyamide and the fibers, a composite material according to the invention may contain additionally different additives in an amount of up to 25 wt %. Such additives are selected to improve specific properties of the composition. Examples include processing agents, like stearates, silicone oil and addition products of ethylene oxide or propylene oxide with fatty alcohols; antioxidants, like sterically hindered phenols and/or thioethers and/or substituted benzotriazoles or the sterically hindered amines of the HALS type; adhesion promoters, for example, silanes containing hydrolysable groups like hydroxy functional, (meth)acryloxy functional, amino functional or epoxyfunctional trialkoxysilanes, including methoxy, ethoxy, propoxy or butoxy groups; tackifying resins, like synthetic resins or natural resins, preferably abietic acid, abietic acid esters, terpene resins, terpene/phenol resins, poly-α-methylstyrene or aliphatic, aromatic or aromatic/aliphatic hydrocarbon resins or coumarone/indene resins; pigments or fillers, like oxides, silicates, sulfates, phosphates or carbonates of Ti, Zr, Al, Fe, Mg, Ca, Ba or Zn, such as titanium dioxide, calcium carbonate, aluminum oxide, treated silicas, precipitated silicas, untreated silicas, pyrogenic silicas, hollow glass beads, talc, wood powder in form of nanoparticles or as powders of less then 5 μm diameter. Additionally, but as less preferred form, fibers of chemical origin can be added, for example glass fibers, polyester fibers, polyaramide fibers or carbon fibers.

Also additives can be used which improve specific properties to the composite material like impact modifiers conventional for polyamides, examples being ethylene-α-olefin copolymers, in particular EPM and EPDM, or styrene-ethylenebutylene block copolymers in particular SEBS; additives which give the molding composition antistatic properties or electrical conductivity, e.g. carbon fibers, graphite fibrils, metal fibers, e.g. fibers comprising stainless steel, metal powder, or conductive carbon black; flame retardants, such as magnesium hydroxide, aluminum hydroxide, melamine cyanurate, phosphorus-containing flame retardants, brominated aromatic compounds; magnetic fillers, e.g. ceramic particles or ferrites.

Additionally the composite material may contain other polymers which are mixable and extrudable with the polyamide. Examples of polymers other than polyamide or copolyamide include thermoplastic polyester, for example polyethylene terephthalate, polybutylene terephthalate, polypropylene terephthalate, polyethylene 2,6-naphthalate, polypropylene 2,6-naphthalate, polybutylene 2,6-naphthalate, or copolyester based thereon; polyolefins, e.g. polypropylene or polymers from natural resources, like polylactic acid. Preferably the amount of such other polymers shall be less than 15 wt % of the total composition.

The polyamide suitable for the invention can be manufactured according to known processes. The polymer can be cooled and stored in an appropriate form e.g. as pellets, powder or in blocks. This polymer can be re-melted and then mixed and processed together with fibers and other parts of the inventive composite material.

The composite material according to the invention comprises
15 to 60 wt % of fibers from natural sources,
35 to 80 wt % of polyamides as described above,
0.1 to 25 wt % of one or more additives,
wherein the polyamides shall have a softening point below 220° C. and a HDT above 50° C., preferably more than 65° C.

A composition according to the invention can be prepared including the components. A suitable process is known to a person skilled in the art. The polymer can be manufactured and provided as solid or melt to a mixing device, to blend the polyamide with the fibers and additives. Such mixing can be preformed e.g. in an extruder, which generates thermal energy to melt and mix the components. The mixture can be cooled and stored in an appropriate form, for example, as blocks or pellets for storage and later processing in an injection molding process. Alternatively, it is possible to process the material directly after mixing to form shaped articles. As the softening point of the polyamide is lower, the natural fibers will not degrade during processing. So it is possible that the composite material will not get dark during manufacture and processing.

Generally, moldings are produced by shaping the molten composition by use of mechanical force within a certain temperature range. This operation can be performed by any known processing method, for example by extrusion, injection molding, pressing, transfer molding, and others. However, according to the invention, the molding composition is preferably converted into moldings by low pressure injection molding. This injection molding cycle comprises the following individual steps:
  the mold is closed, once any parts to be joined together have been inserted,
  the molten molding composition is injected into the mold up to a pressure of between 0.5 and 100 bar, preferably from 1.0 to 50 bar, and holding pressure is optionally applied,
  the molding composition is allowed to solidify by cooling, the mold is opened, and
  the injection moldings are removed from the mold.

Preferably, the moldings are produced by melting the molding composition at temperatures of 130 to 200° C., injecting the melt into closed molds at an excess pressure of 1 to 50 bar, and de-molding the cooled moldings after a short time.

The articles will also show an excellent heat deflection temperature of more than 50° C. Additionally they show an excellent cold flexibility as shown by the glass transition temperature. The chemical and the mechanical resistance are high. The parts will also remain stable in their form at elevated temperature. As the composite material can be processed in molten form such articles can be manufactured in many different shapes. In a further embodiment of the invention the molded parts shall contain other parts to be joined by the composite mold.

The moldings can be formed in different shapes. They can be used in the automotive industry, as appliances, in the general industry. The formed parts can be manufactured at lower processing temperature, but the moldings are stable to an environment which includes wet and humid conditions and also elevated temperature. By the selection of the polyamide material in connection with the fiber material, the heat and form stability at elevated temperature are increased. Additionally, the selection of the polyamides in the composite mixture is performed in a way not to damage the natural fibers by its mechanical properties or by the color. If the polyamide raw materials are selected as being from natural resources in combination with the natural fibers, a molding can be prepared which needs only small amounts of oil based ingredients. The articles can be used as parts in the automotive industry or generally in OEM industries as components which are stable in an elevated temperature environment.

DEFINITIONS

Methods of measurement for the invention and the examples.
Glass transition temperature: DSC, DIN ISO 11357
Viscosity: Brookfield viscosimeter, DIN EN 2555
Molecular weight: mass average, $M_w$, to be measured by GPC with polystyrene standard.
E-modulus (Young modulus): EN ISO 14125
Tensile strength: EN ISO 527-1
Heat deflection temperature (HDT): ISO 75
Softening point: ring and ball method, ISO 4625-1
weighted average number C-atom=($\Sigma$mol %×C-atoms of dicarboxylic acid): 100

[calculation example: acid composition: 25 mol % C10+50 mol % C11+25 mol % C16(25×10+50× 11+25×16):100=10×0.25+11×0.5+16×0.25=12.0]

EXAMPLES

Polymer 1 (Comparison)

A polyamide was produced in a manner known in the art from 41 mol % dodecanedioic acid, 59 mol % dimeric fatty acid, 23 mol % piperazine, 2 mol % JEFFAMINE D 400 and 75 mol % ethylene diamine by a condensation reaction with removal of the water of reaction.

This polyamide exhibited the following characteristic values:
$M_w$=more than 1700000 g/mol
melt viscosity=35000 mPas (225° C.)
softening point=190° C.
HDT=52° C.
Tensile strength=141N/mm$^2$
Young modulus=195 N/mm$^2$ Polymer 2 (Comparison)

A polyamide was produced in a manner known to a person skilled in the art from 100 mol % decanedioic acid, 50 mol % piperazine, 30 mol % JEFFAMINE D 400 and 20 mol % ethylene diamine by a condensation reaction with removal of the water of reaction.

This polyamide exhibited the following characteristic values:
$M_w$=13000 g/mol
melt viscosity=9000 mPas (225° C.)
softening point=170° C.
HDT=45° C.
Tensile strength=9 N/mm$^2$
Young modulus=90 N/mm$^2$ Polymer 3 (Comparison)

A polyamide was produced in a manner known in the art from 41 mol % C9-dicarboxylic acid, 59 mol % dimeric fatty acid, 42 mol % piperazine, 4 mol % JEFFAMINE D 400 and 54 mol % ethylene diamine by a condensation reaction with removal of the water of reaction.

This polyamide exhibited the following characteristic values:
$M_w$=15500 g/mol
melt viscosity=4000 mPas (225° C.)
HDT=47° C.
softening point=175° C.
Tensile strength=9 N/mm$^2$
Young modulus=105 N/mm$^2$ The polyamide examples show that the polymer according to the invention has a high HDT value, which is not achieved by the comparison polymers. Additionally the mechanical properties are improved against the other polyamides.

Example 1

A mixture of 71 g polymer 1, 2 g stabilizer, 23 g cellulosic fibers (0.5-4 mm length, 1% water) and 1 g tackifier was prepared by extrusion at about 175° C.
The mixture was injected in a mould to form a specimen.
Young modulus 650 MPa
Tensile strength 18 N/mm$^2$
HDT=80° C.

Similar examples can be prepared with the same composition but with polyamides 2 and 3. The mixture can be processed by injection molding, but the mechanical properties are less good.

The mechanical properties of the composite material are improved. They remain nearly unchanged during aging.

The invention claimed is:
1. A composite material comprising:
15 to 60 wt % of one or more fibers from natural sources,
80 to 35 wt % of one or more polyamides having a molecular weight between approximately 500,000 and 15,000,000,
0.1 to 30 wt % of one or more additives,
wherein the polyamides have a softening point below 220° C., and a heat deflection temperature above 50° C., and wherein the polyamides are produced from:
  a) 30 to 70 mol % of one or more dimeric fatty acids,
  b) 70 to 30 mol % of one or more aliphatic dicarboxylic acids,
  c) 70 to 98 mol % of one or more aliphatic diamines,
  d) up to 25 mol % of one or more cycloaliphatic diamines, and e) up to 20 mol % of one or more polyether diamines, characterized in that the one or more aliphatic dicarboxylic acids are selected from one or more linear, non-branched C10 to C18 dicarboxylic acids, whereby the weighted average number of C-atoms is between 11.5 to 14.5, wherein the total amount of diamines used amounts to 100 mol % and the total amount of acids used amounts to 100 mol %.

2. The composite material according to claim 1, characterized in that the fibers are selected from animal or plant origin with a length from 1 to 50 mm.

3. The composite material according to claim 2, characterized in that the fibers are selected from cellulose, wool, cotton, flax, linen, hemp, sisal, cocos or wood fibers.

4. The composite material according to claim 3, characterized in that the water content of the fibers is less than 5 wt %.

5. The composite material according to claim 1, characterized in that the polyamides have a softening point from 170 to 200° C. and a heat deflection temperature of 65 to 120° C.

6. The composite material according to claim 5, characterized in that the polyamides have a glass transition temperature of −10 to +25° C.

7. The composite material according to claim 1, characterized in that the aliphatic dicarboxylic acids (b) comprise at least 85 wt % of one or more C12- to C14-dicarboxylic acids.

8. The composite material according to claim 1, characterized in that the aliphatic diamines (c) contain at least 50 to 95 wt % of one or more C2 to C4-diamines.

9. The composite material according to claim 1, characterized in that the additives comprise a flame retardant compound and/or an impact modifier.

10. An article of manufacture made of a composition according to claim 1.

11. An article of manufacture according to claim 10, the article being mechanically stable at a temperature up to 150° C.

12. The composite of claim 1 further including at least one polymer which is mixable and extrudable with the polyamides present in an amount of less than 15 wt % of the total composite material.

13. The composite of claim 1 wherein component d) is present in the amount of 1 to 25 mol %, and component e) is present in the amount of 1 to 20 mol %.

14. A composite material consisting of:
15 to 60 wt % of one or more fibers from natural sources,
80 to 35 wt % of one or more polyamides, and
0.1 to 30 wt % of one or more additives selected from at least one of silicone oil, addition product of ethylene oxide or propylene oxide with fatty alcohol, antioxidant, adhesion promoter, tackifying resin, pigment, filler, impact modifier, antistatic additive, flame retardant, magnetic filler and of one or more polymers other than polyamide,
wherein the polyamides have a softening point below 220° C., a heat deflection temperature above 50° C., and the polyamides are produced from
70 to 30 mol % one or more dimeric fatty acids,
30 to 70 mol % of one or more C10-C18 dicarboxylic acids,
70 to 98 mol % of one or more aliphatic diamines having 20 or fewer carbon atoms,
0 to 15 mol % of one or more dimeric fatty diamines,
1 to 25 mol % of one or more cycloaliphatic diamines,
1 to 20 mol % of one or more polyether diamines,
wherein the total amount of diamines used amounts to 100 mol %, the total amount of acids used amounts to 100 mol %, and the weighted average number of C-atoms of the C10-C18 dicarboxylic acids is between 11.5 to 14.5.

\* \* \* \* \*